United States Patent
Vanstone et al.

(10) Patent No.: US 6,424,712 B2
(45) Date of Patent: *Jul. 23, 2002

(54) ACCELERATED SIGNATURE VERIFICATION ON AN ELLIPTIC CURVE

(75) Inventors: Scott A. Vanstone, Waterloo (CA); Donald B. Johnson, Manassas, VA (US)

(73) Assignee: Certicom Corp., Ontario (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 8 days.

(21) Appl. No.: 08/953,637

(22) Filed: Oct. 17, 1997

(51) Int. Cl.[7] .................................................. H04L 9/28
(52) U.S. Cl. ............................................ 380/28; 380/28
(58) Field of Search ...................................... 380/30, 28

(56) References Cited

U.S. PATENT DOCUMENTS

| | | | | |
|---|---|---|---|---|
| 5,005,200 A | * | 4/1991 | Fischer | 380/30 |
| 5,442,707 A | * | 8/1995 | Miyaji et al. | 380/30 |
| 5,497,423 A | * | 3/1996 | Miyaji | 380/30 |
| 5,572,454 A | * | 11/1996 | Lee et al. | 364/746.1 |
| 5,799,088 A | * | 8/1998 | Raike | 380/30 |

OTHER PUBLICATIONS

Botes and Penzhorn, An Implementation of An Elliptic Curve Cryptosystem, COMS–94, pp. 85–90, 1994.*
Neal Koblitz, A Course in Number Theory and Cryptography 2e, Springer, Chapter VI, 1996.*
James Wertz (ED), Spacecraft Attitude Determination and Control, Reidel, chapter 8, 1985.*
Koblitz, A Course in Number Theory and Cryptography, 2e, Springer–Verlag, pp. 167–185.*

* cited by examiner

*Primary Examiner*—Gail Hayes
*Assistant Examiner*—James Seal
(74) *Attorney, Agent, or Firm*—Finnegan, Henderson, Farabow, Garrett, & Dunner, L.L.P.

(57) ABSTRACT

A public key encryption system exchanges information between a pair of correspondents. The recipient performs computations on the received data to recover the transmitted data or verify the identity of the sender. The data transferred includes supplementary information that relates to intermediate steps in the computations performed by the recipient.

16 Claims, 5 Drawing Sheets

ACCELERATED SIGNATURE VERIFICATION ON AN ELLIPTIC CURVE

The present invention relates to public key data communication systems.

BACKGROUND OF THE INVENTION

Public key data communication systems are used to transfer information between a pair of correspondents. At least part of the information exchanged is enciphered by a predetermined mathematical operation by the sender and the recipient may perform a complementary mathematical operation to decipher the information.

A typical example of such a system is a digital signature protocol. Digital signatures are used to confirm that a message has been sent by a particular party and that the contents have not been altered during transmission.

A widely used set of signature protocols utilizes the El Gamal public key signature scheme that signs a message with the sender's private key. The recipient may then recover the message with the sender's public key.

Various protocols exist for implementing such a scheme and some have been widely used. In each case however the recipient is required to perform a computation to verify the signature. Where the recipient has adequate computing power this does not present a particular problem but where the recipient has limited computing power, such as in a "Smart card" application, the computations may introduce delays in the verification process.

Public key schemes may be implemented using one of a number of multiplicative groups in which the discrete log problem appears intractable but a particularly robust implementation is that utilizing the characteristics of points on an elliptic curve over a finite field. This implementation has the advantage that the requisite security can be obtained with relatively small orders of field compared with, for example, implementations in $Z_p^*$ and therefore reduces the bandwidth required for communicating the signatures.

In a typical implementation a signature component s has the form:

$$s = ae + k \pmod{n}$$

where:

P is a point on the curve which is a predefined parameter of the system k is a random integer selected as a short term private or session key, and has a corresponding short term public key R=kP a is the long term private key of the sender and has a corresponding public key aP=Q e is a secure hash, such as the SHA hash function, of a message m and short term public key R, and n is the order of the curve.

The sender sends to the recipient a message including m, s, and R and the signature is verified by computing the value −(sP−eQ) which should correspond to R. If the computed values correspond then the signature is verified.

In order to perform the verification it is necessary to compute a number of point multiplications to obtain sP and eQ, each of which is computationally complex. Other protocols, such as the MQV protocols require similar computations when implemented over elliptic curves which may result in slow verification when the computing power is limited.

Typically, the underlying curve has the form $y^2+xy=x^3+ax+b$ and the addition of two points having coordinates $(x_1, y_1)$ and $(x_2, y_2)$ results in a point $(x_3, y_3)$ where:

$$x_3 = \left\{\left(\frac{y_1 \oplus y_2}{x_1 \oplus x_2}\right)^2 \oplus \frac{y_1 \oplus y_2}{x_1 \oplus x_2} \oplus x_1 \oplus x_2 \oplus a\right\} \quad (P \neq Q)$$

$$y_3 = \left\{\left(\frac{y_1 \oplus y_2}{x_1 \oplus x_2}\right) \oplus (x_1 \oplus x_3) \oplus x_3 \oplus y_1\right\} \quad (P \neq Q)$$

The doubling of a point i.e. P to 2P, is performed by adding the point to itself so that $$y_3 = \left\{x_1^2 \oplus \left(x_1 \oplus \frac{y_1}{x_1}\right)\right\} x_3 \oplus x_3$$

$$x_3 = x_1^2 \oplus \frac{b}{x_1^2}$$

It will be appreciated that successive doubling of the point Q produces values for $2Q, 2^2Q, 2^3Q \ldots 2^jQ$ and that these values may be substituted in the binary representation of the hash value e and added using the above equations to provide the value eQ. At most this would require t doublings and t point additions for a t bit representation of e. Similarly the point P may be doubled successively and the values substituted in the representation of s to obtain sP. However, the generation of each of the doubled points requires the computation of both the x and y coordinates and the latter requires a further inversion. These steps are computationally complex and therefore require either significant time or computing power to perform. Substitution in the underlying curve to determine the value of y is not practical as two possible values for y will be obtained without knowing which is intended.

It is therefore an object of the present invention to provide a method and apparatus in which the above disadvantages are obviated or mitigated.

SUMMARY OF THE INVENTION

In general terms, the present invention provides a method and apparatus in which the transmitted data string is modified to include information additional to that necessary to perform the verification but that may be used to facilitate the computations involved in the verification.

BRIEF DESCRIPTION OF THE DRAWINGS

Embodiments of the present invention will now be described by way of example only with reference to the accompanying drawings, in which.

DESCRIPTION OF THE PREFERRED EMBODIMENTS

Figure 1:
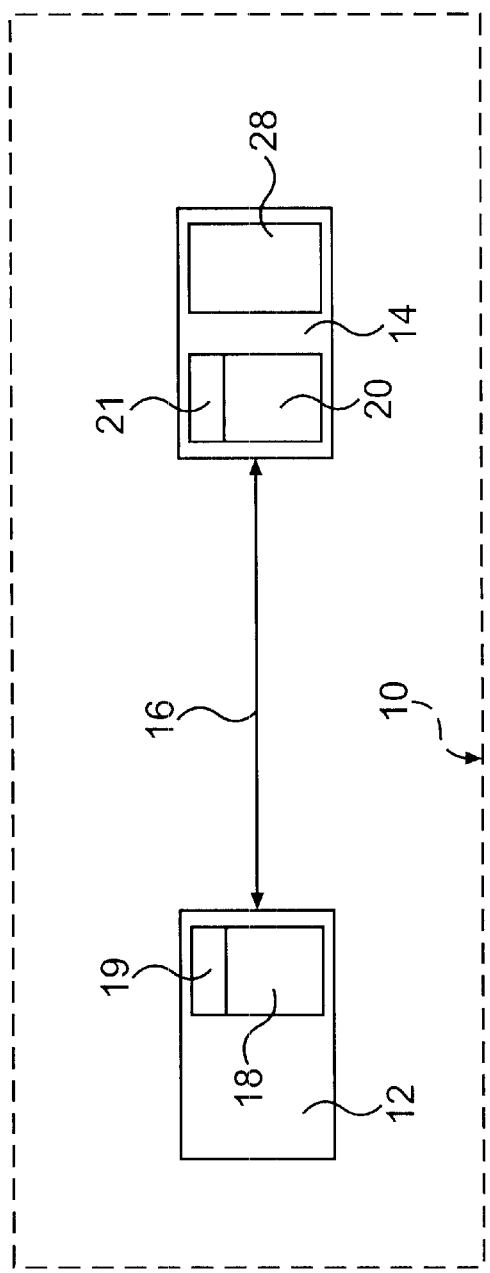
FIG. 1 is a schematic representation of a communication system.

Referring therefore to FIG. 1, a data communication system 10 includes a pair of correspondents, designated as a sender 12, and a recipient 14, who are connected by a communication channel 16. Each of the correspondents 12,14 includes an encryption unit 18,20 respectively that may process digital information and prepare it for transmission through the channel 16 as will be described below. Each of the correspondents 12,14 also includes a computational unit 19,21 respectively to perform mathematical computations related to the encryption units 18,20. The computational power of the units 19,21 will vary according to the nature of the correspondents 12,14 but for the purpose of the present disclosure, it will be assumed that the unit 19 has greater power than that of unit 21, which may in fact be a Smart card or the like.

Figure 2:
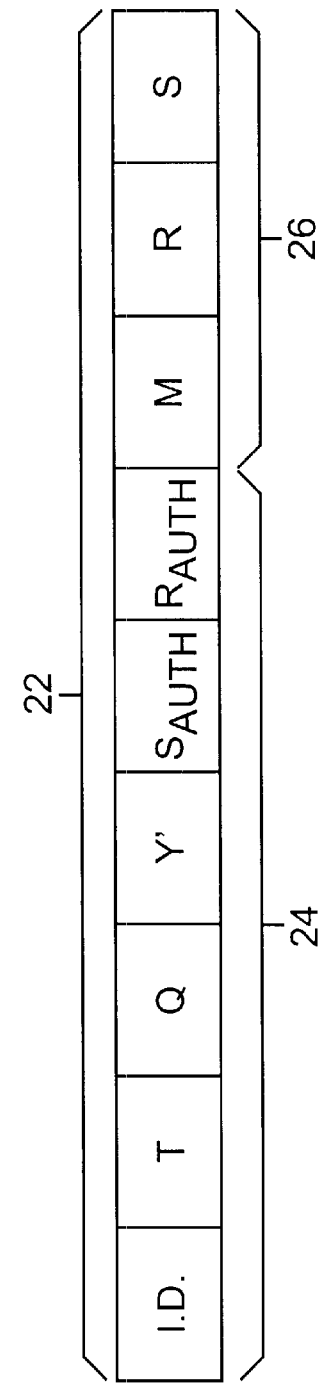
FIG. 2 is a representation of the data format transmitted over the communication system in a first embodiment.

In accordance with a first embodiment, the sender 12 assembles a data string 22 shown schematically in FIG. 2. The data string 22 includes a certificate 24 from the certifying authority CA that includes the an identifier I.D. of the sender; a time stamp T; the public key Q of the sender; a string of bits y' representing supplementary information; the signature component $S_{auth}$ of the certifying authority; and the short term public key $R_{auth}$ of the certifying authority. The data string 22 also includes a senders certificate 26 that includes the message m, the senders short term public key R and the signature component s of the sender. The string of bits y' included in the certificate 24 is obtained from the computational unit 19. The unit 19 performs at least part of the mathematical operations required to verify the signature at the recipient 14 and extracts from the computations the supplementary information y. When assembled, the data string 22 is sent over the channel 16 to the intended recipient 14.

For simplicity it will be assumed that the signature component s of the sender 12 is of the form s=ae+k (mod n) as discussed above, although it will be understood that other signature protocols may be used. To verify the signature, sP-eQ must be computed and compared with R.

The certifying authorities signature component $s_{auth}$ is of similar form with its message m composed of the identifier I.D., time T and the sign bits y'.

The first step in the verification by the recipient 14 is to retrieve the value of Q and the sign bits y' from the certificate 24 using the certifying authorities public key. A hash value e' is also computed from the message m and the coordinates of the point R in the senders certificate 26. The recipient 14 is then able to perform the verification by computing sP and e'Q. However, as noted above, the computational unit 21 has limited computing power and the computation of sP and e'Q may be time-consuming.

One or more of a number of enhancements are therefore adopted to facilitate the verification. In a first embodiment, use is made of the fact that P is a long-term system parameter. Values corresponding to integral multiples of P may be stored at the recipient 14 in lookup tables indicated at 28 in FIG. 1. The integer corresponding to s is thus located in table 28, as shown at 38 in FIG. 3, and the value sP retrieved to provide a first component of the verification.

The value of Q will vary from sender to sender and accordingly it is not practical to pre-compute the possible values of e'Q in a manner similar to sP. To facilitate the computation of e'Q, e' is treated, as shown at 36, as a binary representation of an integer with each bit indicative of a coefficient of successive values of $2^j$. The computational unit 19 at sender 12 is used to double successively the point Q so that the coordinates of $2^jQ$ are obtained. The most significant bit of the y coordinate indicates the "sign" of the y coordinate and a string of bits representing the signs of the y coordinates of the successively doubled points is incorporated as the supplementary information y' in the certificate 24. To compute the value of e'Q at the recipient 14, the x coordinate of the point Q is successively doubled, at 40, by applying the equation noted above so that the x coordinates of successive values of $2^jQ$ are obtained. Where the binary representation of e' indicates that a value of $2^jQ$ is required (ie. where the coefficient is "1"), the corresponding value of the y coordinate is determined, at 42, by substitution in the underlying curve. Two possible values of the y coordinate are obtained, at 44, and the appropriate value is determined by reference to the sign bits y' retrieved from the certificate 24. Accordingly, the computation of the y coordinate that requires an inversion is avoided.

Having obtained, at 48, each pair of coordinates for the coefficients of $2^jQ$, they may be combined, at 52, to provide the value for e'Q and combined with sP to obtain sP-e'Q. This is then compared, at 54, with the recovered value of R for verification.

It will be appreciated that sP may be computed in a manner similar to e'Q with the inclusion of additional sign bits for the y coordinates of $2^jP$ in the certificate 24. It is, however, believed to be preferable to utilize the lookup tables 28 where practical.

Figure 3:
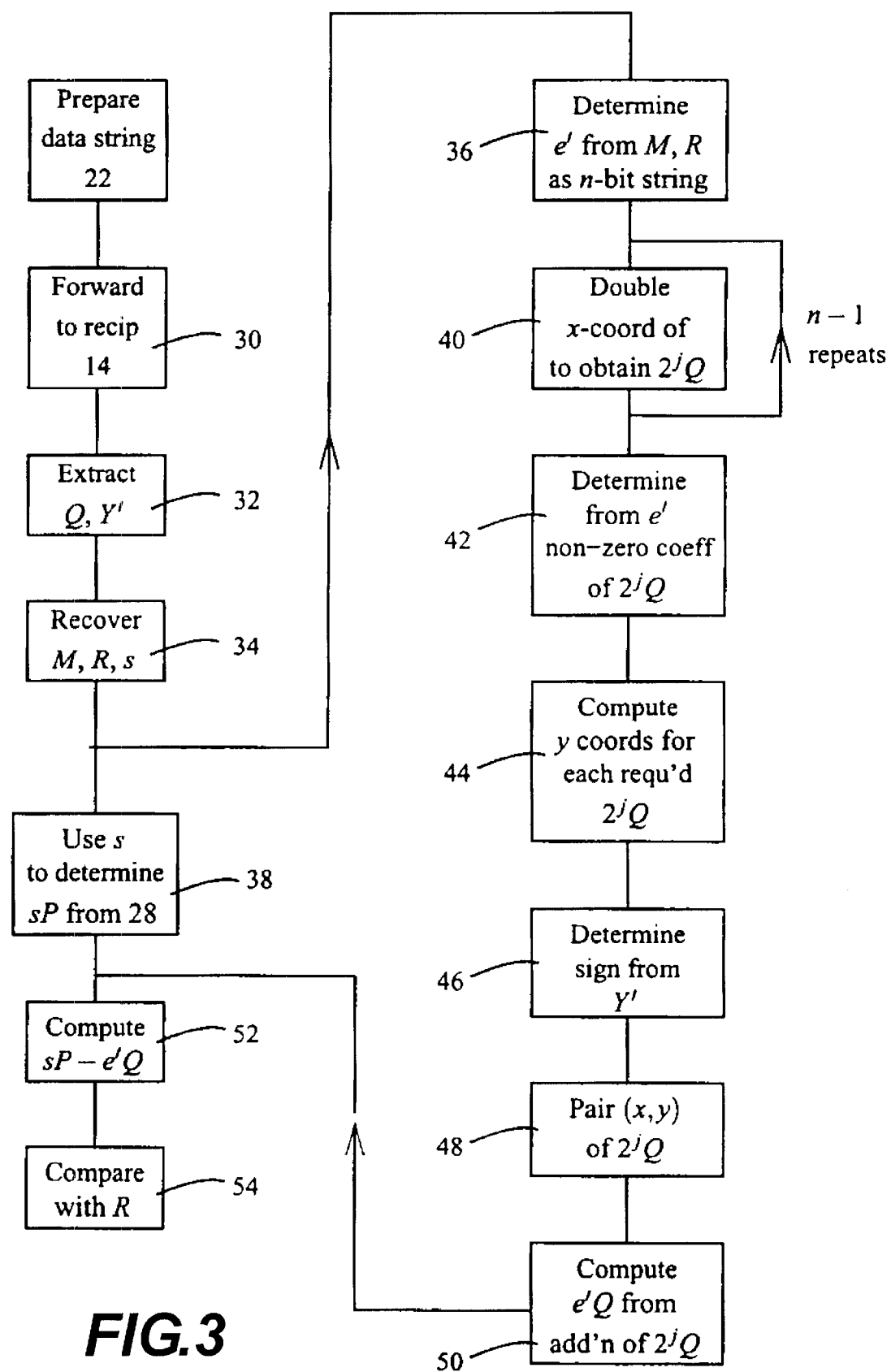
FIG. 3 is a flow chart showing the steps in verifying a signature transmitted over the system of FIG. 1 using the data format of FIG. 2.
Figure 4:
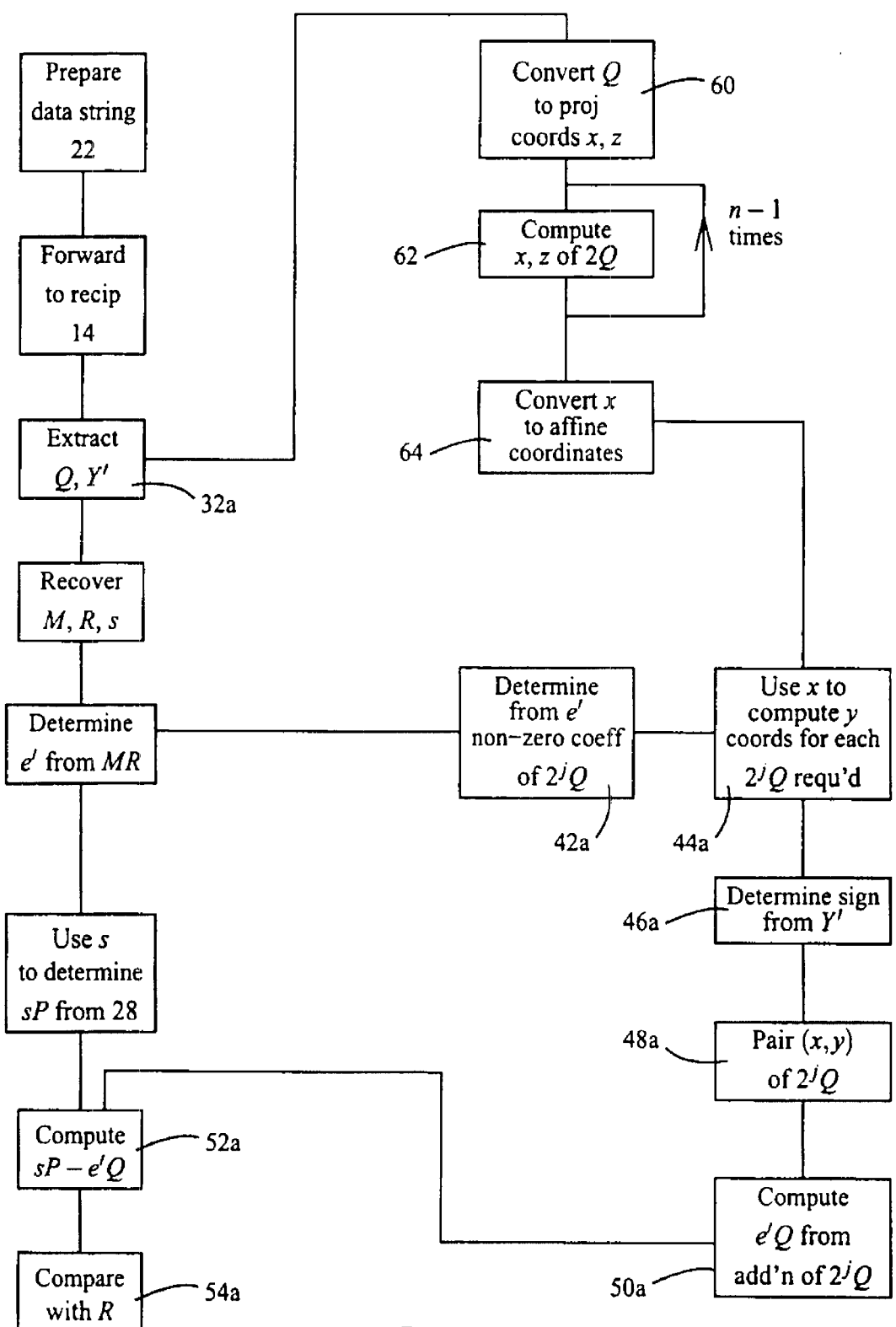
FIG. 4 is a flow chart showing the verification according to a second embodiment.

Although the above procedure reduces the computational complexities, the computation of the x coordinate still requires an inversion. Inversion is relatively costly and to facilitate the computation, the process of FIG. 3 is modified as shown in FIG. 4 where like steps will be denoted eith like reference numerals with a suffix, a, added for clarity. Upon receipt of the data string 22, the recipient 14 recovers the affine coordinates (x, y) of the point Q and converts them (60) into projective coordinates (x, y, z) by replacing x with x/z and y with y/z.

The value of the x and z coordinates of the point 2Q can then be calculated using the relationship in that $2(x_1, y_1, z_1)=(x_2, y_2, z_2)$ where $$x_2 = x_1^4 + z_1^4 b$$

and $$z_2 = (x_1 z_1)^2$$

"b" is the constant associated with the underlying curve and can be chosen suitably small, ie. one word.

Once the x and z values for 2Q have been computed, as indicated at 62 they may be used in a similar manner to obtain the values of x and z for 4Q. This may be repeated up to $2^tQ$ so that the t sets of projective coordinates each representing the x and z coordinates of a respective one of $2^jQ$ $0 \leq j \leq t$ are obtained.

Each of the projective x coordinates is converted, at 64, into a corresponding affine coordinate by dividing the x coordinate by the z coordinate. The x coordinate of the respective values of $2^jQ$ can then be used where necessary in the representation of e' to obtain the corresponding y coordinates by substitution in the equation representing the underlying curve, as shown at 42a and 44a. The corresponding y value is obtained by inspection, at 46a of the sign bits y' included in the data string 22 which indicates the appropriate value.

With each of the coordinates obtained, at 48a, the values for $2^jQ$ can be substituted in the binary representation of e and the resultant value of eQ obtained, at 50a,. As the representation of e will be a string of 1's and 0's, only those values having a coefficient of 1 need be combined to simplify the computation further. The result may then be combined with the value of sP, at 52*a*, and compared with the retrieved value of R to obtain a verification, at 54*a*.

It will be seen, therefore, that a verification is obtained without requiring an inversion at each addition to obtain the successive x coordinates which facilitates the verification process. The computation of the values of $2^j Q$ can be readily obtained if the elliptic curve is implemented over the field GF2 when represented in normal basis representation. In this case, the computation of $x_1^4$ and $z_1^4$ is obtained by two cyclic shifts of the representation of the respective coordinates. After multiplying with "b", the result is XOR'd to obtain the value of the resultant x coordinate. Similarly, the value of the z coordinate can be obtained from a cyclic shift of the product of $x_1$ and $z_1$.

The above procedure may be modified with an increase in bandwidth by forwarding in the certificate the x coordinate of Q and each of the y coordinates of $2^j Q$. Some of these will of course be redundant depending on the representation of e'. However, in this manner the computation of the y coordinates is avoided but the length of the message is increased. This may be acceptable, particularly where limited computing power is available at the recipient.

As a further variant, the message could be modified to include both the x and y coordinates for each value of $2^j Q$ with the attendant redundancy. This has the effect of minimizing the computation of eQ but does increase the message length.

Figure 5:
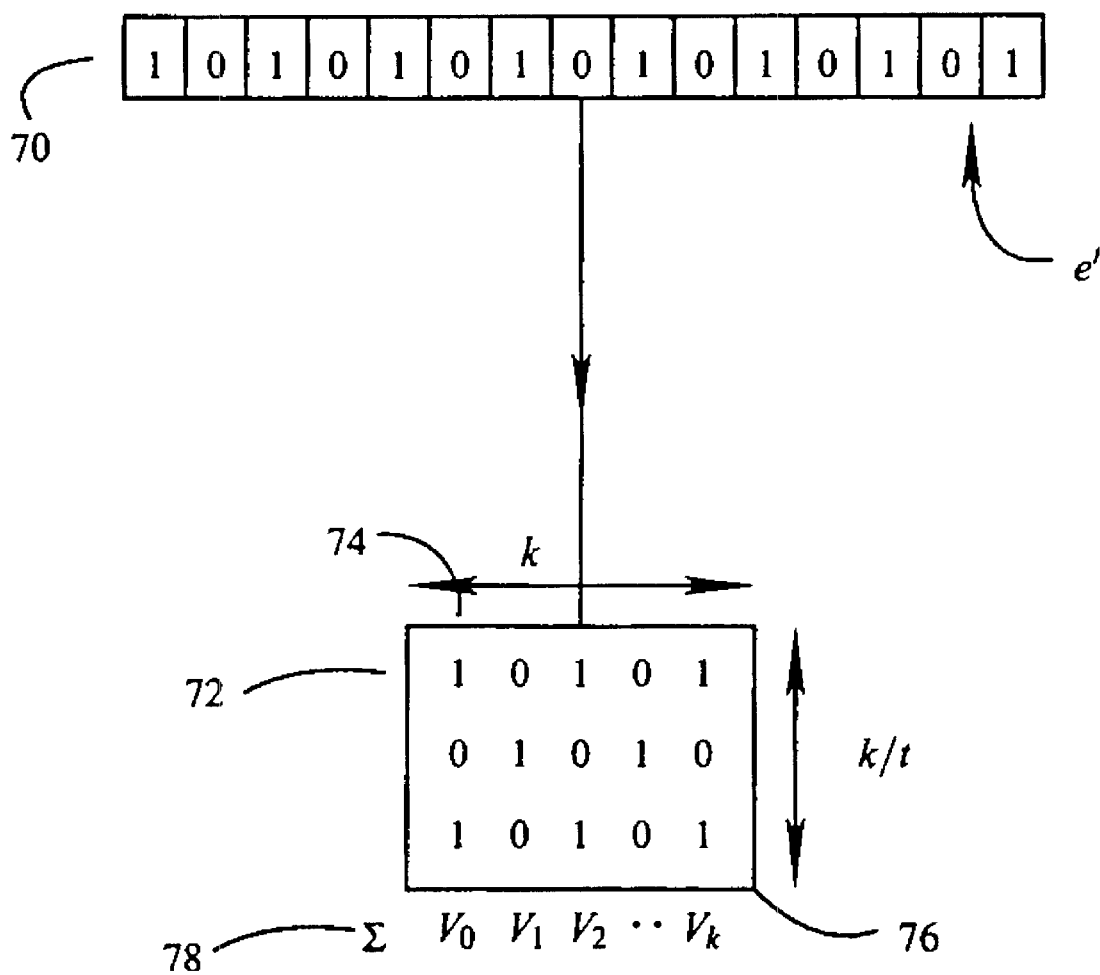
FIG. 5 is a representation of the data transmitted over the communication system in a third embodiment.
Figure 6:
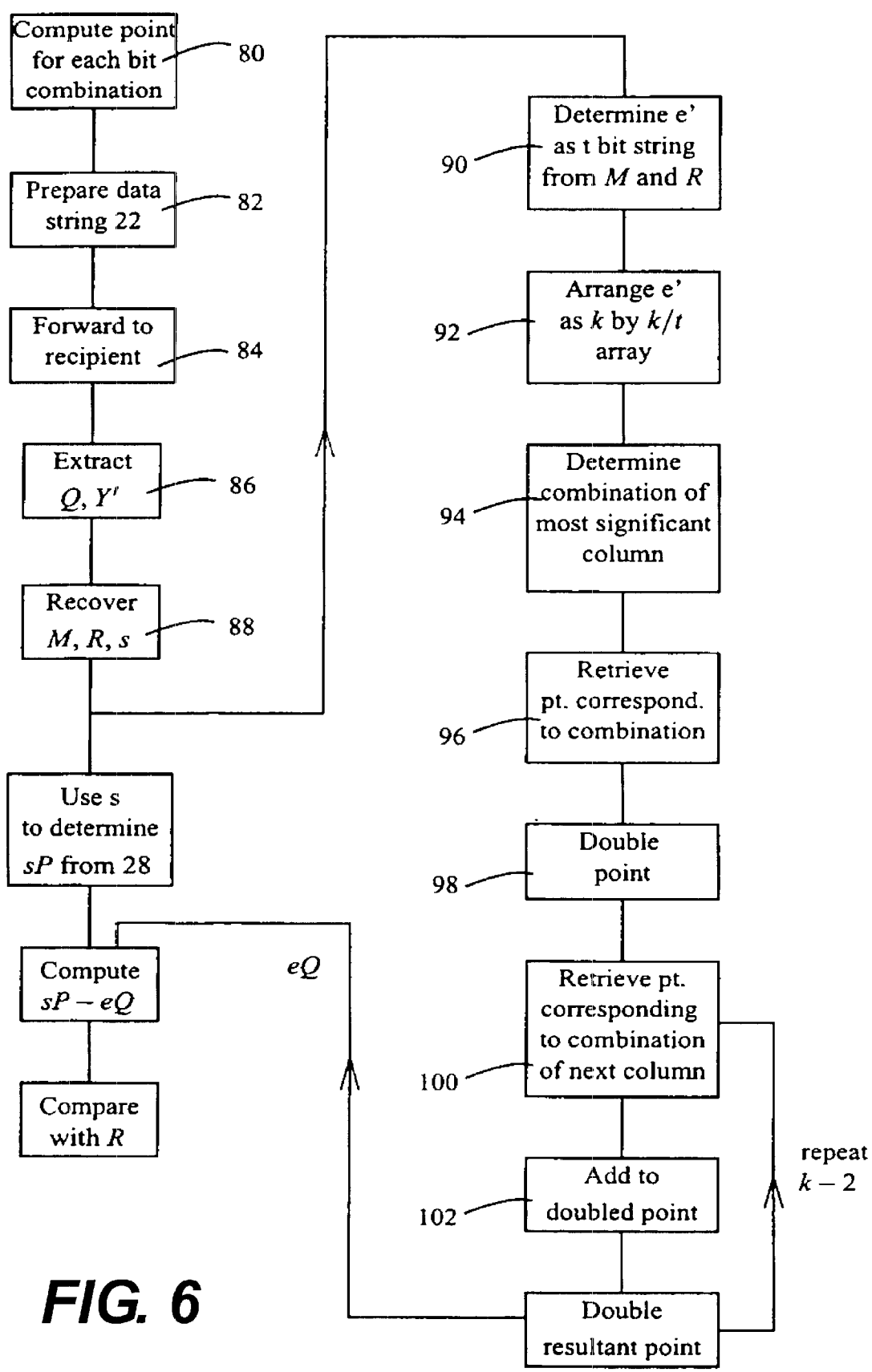
FIG. 6 is a flow chart showing the steps of verifying the signature using the data format of FIG. 5.

A further embodiment is shown in FIGS. 5 and 6 where combing is used to facilitate the computation of eQ. If e is a t bit binary number, it may be represented as a k-fold matrix, 72, having k columns, 74, and t/k rows, 76,. If the sum, 78, of each column is $V_1$, $V_2$, $V_3$ ... $V_k$, then $$e = V_1 + 2V_2 + 2^2 V_3 + \ldots + 2^{k-1} V_{k-1} + 2^k V_k,$$

and $$eQ = V_1 Q + 2V_2 Q + 2^2 V_3 Q + \ldots + 2^{k-1} V_{k-1} Q + 2^k V_k Q$$

Each of the columns may have one of $2^{t/k}$ combinations of bits. Each combination will produce a particular value $\Sigma_1$, $\Sigma_2$, $\Sigma_3$ etc. for V which has to be multiplied by the point Q to obtain the coordinates of the point $2^j V_j Q$. The certificate 24 is thus modified, as shown at 80 and 82, to include in an ordered, retrievable manner the coordinates of the $2^{t/k}$ possible points resulting from the combination of bits in the columns which have been pre-computed by the sender 12. The certificate is forwarded at 84 to recipient 14, and, upon receipt, the recipient 14 extracts, at 86 and 88, the message m and point R to obtain a recovered value for e, (90). This bit string is arranged, at 92, in a k-fold matrix of established configuration and the bit combination of the most significant column determined (94). The coordinates of the point resulting from this combination is obtained from the certificate 24 (96), and doubled (98). The point corresponding to the bit combination in the next most significant column is retrieved, as shown at 100, and added (102) to the result of the previous doubling. This is then doubled and the procedure repeated until e'Q is computed. In this way a reduced number of point additions is required, a maximum of 2 k, and the bandwidth required to transmit the information is reduced. The sign bit string y' may be utilized to provide the sign bits of the y coordinates of the doubled points and added points to facilitate the computation.

In each of the above cases, the data string 22 includes additional information that may be utilized to facilitate the computation of the value eQ. In each case, however, the integrity of the signature is not compromised as the information could be computed from the contents of the data string as part of the verification process. The value of e with which the information is subsequently used is derived from the received data string so that tampering with the senders certificate would produce an incorrect verification. The additional information is contained within the certifying authorities certificate and forms part of the signature component and so that it cannot be substituted by an attacker without detection.

It will be seen therefore that in each embodiment the verification of a signature is facilitated by forwarding information to the recipient in addition to that required for verification and which facilitates the verification computation. It will be appreciated that while the embodiments describe the operation between a pair of correspondents, one of those correspondents could be a certifying authority or trusted intermediary. The CA receives a message from an originating correspondent, computes the supplementary information, assembles the data string and forwards the data string to the recipient. In this manner, the public key exchange between a pair of correspondents each having limited computing power may be facilitated.

The above embodiments have been described in the context of a signature verification protocol. However, the techniques may be utilized on other public key operations such as key agreement or key transport protocols. Examples of these protocols are the MQV protocols or protocols set out in IEEE P 21363 draft standard. In such protocols, it is typically necessary to generate a scaled multiple of a point on the curve, i.e. kP where k is an integer and P is a point on the curve. Accordingly, the information transferred between correspondents may be modified to include supplementary information to facilitate the computations involved in such protocols.

The embodiments of the invention in which an exclusive property or privilege is claimed are defined as follows:

1. A method of transferring data over a communication channel between a pair of correspondents who perform public key cryptographic operations by implementing respective ones of a pair of complementary mathematical operations utilizing a public key and a private key of one of said correspondents upon information transferred between said correspondents, said method comprising the steps of:
    a) assembling at one of said correspondents a data string including information to be transferred to the other of said correspondents;
    b) performing at said one correspondent one of said complementary mathematical operations upon at least a portion of said data string to provide a cryptographic component to said data string;
    c) incorporating in said data string additional information supplementary to that necessary for said other correspondent to perform said complementary mathematical operation of said public key cryptographic operation and relating to the computation of intermediate steps involved in the performance of said complementary mathematical operation;
    d) forwarding said data string over said communication channel to said other correspondent; and
    e) performing the other of said complementary mathematical operations of said public key cryptographic operation at said other correspondent with said additional information being available to facilitate the computation of intermediate steps involved in said complementary mathematical operation of said public key cryptographic operation.

2. A method according to claim 1 wherein said one complementary mathematical operation utilizes a public key of said other correspondent to provide a digital signature of at least said portion of said data string.

3. A method according to claim 1 wherein said complementary mathematical operations utilize characteristics of the group of points on an elliptic curve over a finite field.

4. A method according to claim 3 wherein said additional information includes data pertaining to coordinates of points on said curve.

5. A method according to claim 4 wherein said additional information includes data pertaining to coordinates of points on said curve obtained by successive doubling of a designated point on said curve.

6. A method according to claim 5 wherein said additional information includes an indication as to which of a pair of possible values resulting from said intermediate steps is an intended value.

7. A method according to claim 5 wherein said additional information includes a coordinate of each of said points.

8. A method according to claim 5 wherein said additional information includes a pair of coordinates of each of said points.

9. A method according to claim 3 wherein one of said intermediate steps includes obtaining projective coordinates of points on said curve resulting from successive doubling of a designated point.

10. A method according to claim 9 including the step of converting a projective coordinate of at least one of said points to a corresponding affine coordinate and utilizing said additional information to determine the other affine coordinate of said one point therefrom.

11. A method according to claim 10 wherein said additional information includes an indication as to which of a pair of possible values of said other affine coordinate is an intended value.

12. A method according to claim 3 wherein said complementary mathematical operation requires the computation of a point on the curve that is an integral multiple of a designated point, said method including the steps of representing said integer as a t bit binary string, arranging said binary string as a k by k/t combing table, including in said additional information the points resulting from each possible combination of bits in columns in said combing table, selecting the points corresponding to the combination of bits in respective columns of said table and subsequently combining the selected points to obtain the coordinates of said point.

13. A method according to claim 12 wherein said selected points are combined by
   a) doubling a point;
   b) adding the doubled point to the next selected point;
   c) doubling the resultant point; and
   d) repeating steps b) and c) until a single point representing the integral multiple of the designated point is obtained.

14. The method of claim 13 wherein said additional information includes data pertaining to coordinates of the points obtained from doubling and adding the selected points.

15. A method of transferring data over a communication channel between a pair of correspondents who perform public key cryptographic operations by implementing respective ones of a pair of complementary mathematical operations utilizing a public key and a private key of one of said correspondents upon information transferred between said correspondents, said method comprising the steps of:
   a) assembling at one of said correspondents a data string including information to be transferred to the other of said correspondents;
   b) performing at said one correspondent one of said complementary mathematical operations upon at least a portion of said data string to provide a cryptographic component to said data string;
   c) making available to said other correspondent additional information supplementary to that necessary for said other correspondent to perform said complementary mathematical operation of said public key cryptographic operation and relating to the computation of intermediate steps involved in the performance of said complementary mathematical operation;
   d) forwarding said data string over said communication channel to said other correspondent; and
   e) performing the other of said complementary mathematical operations of said public key cryptographic operation at said other correspondent with said additional information being available to facilitate the computation of intermediate steps involved in said complementary mathematical operation of said public key cryptographic operation.

16. A method according to claim 15 wherein said additional information is a set of multiples of a point P on an elliptical curve.

* * * * *